Patented Dec. 12, 1950

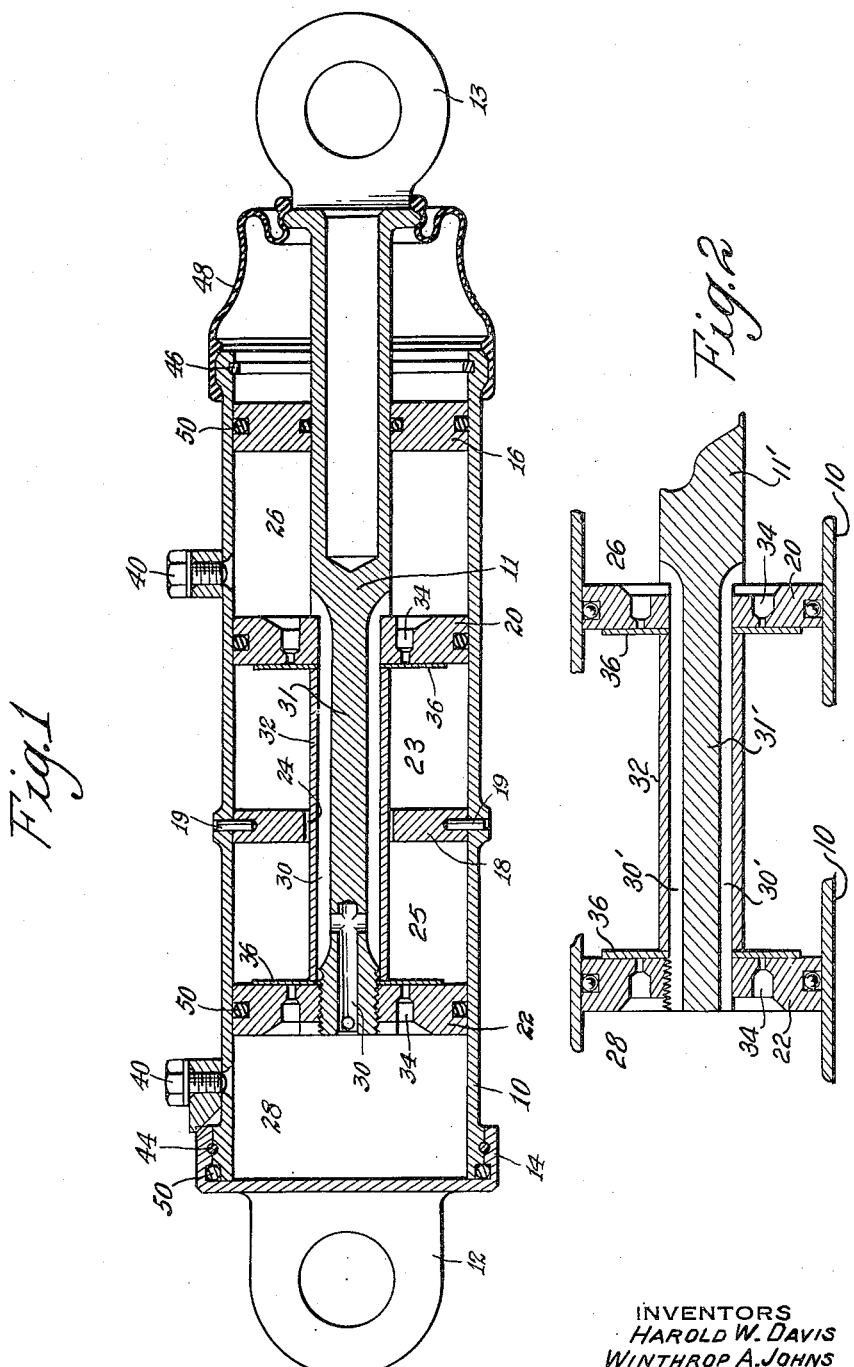

2,533,226

UNITED STATES PATENT OFFICE 2,533,226

HYDRAULIC DAMPING MECHANISM

Harold W. Davis, Bound Brook, and Winthrop A. Johns, North Plainfield, N. J., assignors, by mesne assignments, to Vibradamp, Incorporated, New Brunswick, N. J., a corporation of New Jersey Application May 30, 1945, Serial No. 596,784

6 Claims. (Cl. 188—88)

This invention relates to hydraulic damping devices of the general class called dash pots. In such devices it is usual to have a piston moving within a cylinder and forcing liquid, such as oil, through a restricted orifice. The passage of the oil through the orifice permits slow movement of the piston. Damping devices of this character have been extensively used as shock absorbers in road vehicles and in the landing gear of airplanes. Another important use has been on the wings or blades of rotating-wing aircraft, such as helicopters and the type known under the trade name Autogiro, to damp inherent oscillations of the blades. Our invention is more particularly concerned with an improved damping device adapted especially to this latter use.

It has previously been proposed to provide damping devices in which two pistons rigidly fixed to a piston rod are spaced on opposite sides of a diaphragm having a restricted orifice. The space between the pistons is filled with liquid, which being incompressible permits movement of the pistons only by flowing through the restricted orifice from one side of the diaphragm to the other. Examples are shown in the patents to Hild, No. 1,273,059, Clifford, No. 1,003,703, and Messier, No. 2,029,829. All previously proposed devices of this character which have come to our attention have the disadvantage that slight leakage occurs between the piston and the cylinder and after a brief period of operation liquid is lost from the space between the pistons. This permits lost motion between the piston rod and cylinder which must be taken up before any effective damping action occurs.

It is extremely important that there be no lost motion when the damping device is used on rotating-wing aircraft, because the total movement of the damping device is both very small (it may be of the order of $\frac{1}{8}$ of an inch) and very rapid (for example, of the order of 250 cycles per minute). Therefore, a very small amount of lost motion can completely destroy the effectiveness of the damping device. All of the known devices which have come to our attention have this disadvantage to a greater or lesser degree.

Our invention seeks to overcome the above described disadvantages by providing an improved construction which prevents even minute amounts of lost motion and keeps the high-pressure hydraulic chambers completely filled at all times.

In the accompanying drawings:

Fig. 1 is a longitudinal section through one form of damping device embodying our invention; and Fig. 2 is a fragmentary section corresponding to Fig. 1 showing a modified construction of a detail.

Referring to the drawing, the damping device includes in general a cylinder 10 and a piston rod 11 which are relatively movable and which are to be secured by eyes 12 and 13 to the relatively movable elements to be damped. The cylinder is closed at one end by a cap 14, and at the other end by a plug 16 through which the piston rod passes. Near the longitudinal center of the cylinder, a diaphragm 18 is fixed to the cylinder wall in any suitable manner as by pins 19, dividing the cylinder into two sections or chambers. The piston rod 11 extends through the diaphragm 18 and carries a pair of pistons 20 and 22 fixed to the rod on opposite sides of the diaphragm and defining between them high-pressure chambers 23 and 25 on either side of the diaphragm. Communication between these two high-pressure chambers is effected by a restricted orifice, which is most conveniently formed by the space between the piston rod and the opening 24 in the diaphragm through which the rod passes.

The spaces between the pistons and the ends of the cylinder provide low-pressure hydraulic chambers 26 and 28. It is necessary that these chambers be in communication to permit oil to be displaced from one to the other when the pistons move. This communication is preferably effected in accordance with our invention by one or more conduits 30 within the piston rod. Preferably the piston rod includes an inner core 31 and an outer sleeve 32, and the conduits are formed by drilling appropriate openings, milling grooves along the length of the appropriate portion of the core, and covering the grooved portion with the sleeve 32 which effectively prevents communication between the grooves and the high-pressure chamber. Each piston is provided with one or more orifices 34 which establish communication between the low-pressure and high-pressure chambers under the control of a check valve 36 opening inwardly into the high-pressure chamber. Preferably each check valve consists of a thin flexible steel disk accurately fitted over the reduced diameter of the piston rod and seated firmly against the piston by the sleeve 32, the ends of which are accurately ground to seat firmly against the valve. When this apparatus is assembled the piston 20 seats against a shoulder on the piston rod and the pistons, sleeve, and valves are held securely in their proper relationship by threading the piston rod into the piston 22. The valves are inherently normally closed.

The entire space within both the high-pressure and low-pressure chambers is filled with any suitable non-congealing liquid, such as oil, which may be introduced through the filler plugs 40.

One of the purposes of providing low-pressure oil reservoirs or chambers, such as 26, is to enable the piston rod to be packed by a low-pressure seal. To maintain low pressure, oil leaking from the high-pressure chamber must be prevented from transmitting pressure to the seal. Consequently it is necessary that the low-pressure chamber be expansible or else have room for an increased quantity of oil. In damping devices previously constructed, this result has been attempted by filling the low-pressure chambers only partially with oil, as in the Messier patent referred to. While this permits maintaining of the low-pressure seal, it has the disadvantage of preventing immediate and complete transfer of leakage from the low-pressure cylinder back into the high-pressure cylinder when the piston starts to move. This permits lost motion.

Moreover in our particular construction it is necessary for the sum of the volumes of the low-pressure chambers to vary with movement of the piston, because as the rod is moved into and out of the cylinder, the free volume of the space around the rod changes.

We maintain low pressure on the seal and compensate for the change in volume of the piston rod within the cylinder by permitting the plug or floating piston 16 to slide within the cylinder. The plug can be moved outward by the liquid which leaks from the high-pressure chamber into the low-pressure chambers, and is automatically moved inward by atmospheric pressure to follow the diminishing sum of the volumes of the low-pressure chambers as the piston rod is withdrawn from the cylinder. This assures that the low-pressure chambers will always be completely filled with liquid. This forms an expansible low-pressure chamber.

The cap 14, with which the eye 12 is integrally formed, may be secured to the cylinder in any suitable manner, preferably by a wire 44 which is fed endwise through an opening, not shown, into a pair of mating grooves in the cap and cylinder. The plug 16 is held within the cylinder by a stop wire 46, which springs into a groove in the cylinder wall. A boot 48 may be secured to the piston rod and cylinder to exclude dirt. Preferably the cap 14, pistons 20 and 22, and floating piston 16 are suitably sealed or packed, for example by rings as indicated at 50 in the drawing. These may be toroidal rubber rings placed in suitable grooves. Liquid under pressure leaking into the grooves tends to flatten the rings toward the low-pressure face of the grooves, thus pressing the rings against the bottoms of the grooves and against the sides of the cylinder or piston rod to exert sealing pressure.

In operation, movement of the piston assembly in either direction from the position shown in the drawing will produce high pressure in the liquid confined between the diaphragm 18 and the piston which is approaching the diaphragm and force this through the restricted orifice between the sleeve 32 and opening 24 in the diaphragm. The orifice or diameter of the sleeve can be adjusted or selected to permit any desired speed of movement.

The forces involved and the pressures developed may be very great and may cause the high pressure fluid to leak past the approaching piston 20 or 22 in spite of the packing rings. While the quantity which may leak in this manner is in practice relatively slight, it is important that even this slight amount of liquid be returned to the high-pressure chambers to prevent accumulated loss and to prevent lost motion. This is automatically accomplished by the check valves 36. Consider, for example, that the piston assembly is being moved to the right, as shown in the drawing, and that there is a slight amount of space in the high-pressure chambers due to previous leakage. The check valve on piston 22 remains closed. The liquid in low-pressure chamber 26 is under pressure of the piston 20 against the atmospheric pressure on the plug 16 and the liquid in chamber 28 has its pressure reduced. This condition permits liquid in chamber 26 to flow to the chamber 28, keeping it filled, and to open the check valve on the piston 20 and flow into the high-pressure chamber 23 until the latter is filled. Thereafter movement of the piston under control of the orifice 24 is permitted due to the communication between the low-pressure chambers, for as pressure in chamber 26 is increased, it decreases in chamber 28 and liquid in chamber 26 automatically flows to chamber 28 as required. When the motion of the piston is reversed the chamber 23 is completely filled, and so immediately checks the piston without lost motion. As movement toward the left continues, any space previously left in the high pressure chamber 25 is filled from the low pressure chamber 28 through the check valve 36 on piston 22. In this way every time the motion is reversed any slight previous leakage is returned to the high-pressure chambers. These, then, are kept continuously filled and continuously control small amplitude vibrations without lost motion. This action occurs regardless of the orientation of the cylinder, by which is meant the position and direction of its axis with respect to some fixed point. The action occurs as well when inverted as when upright. Liquid in chamber 26 is never under high pressure, and this enables the cylinder to be effectively sealed by the low-pressure packings on the movable piston 16. In the modified form shown in Fig. 2, the conduits 30 are formed in the piston rod by milling in the core 11' grooves 30' which extend from the low-pressure chamber 26 entirely through the threaded end of the piston and into the low-pressure chamber 28. This provides a more economical construction of the passageways between the low-pressure chambers and eliminates the drilling of openings indicated in Fig. 1.

We claim as our invention:

1. Hydraulic damping means including in combination a cylinder closed at its ends, a diaphragm fixed in the cylinder dividing it in two parts, a piston rod passing through one of the closed ends into the cylinder and through the diaphragm, a restricted orifice connecting said two parts, a pair of pistons fixed to the rod on opposite sides of the diaphragm, each piston being spaced from the diaphragm to provide a high-pressure hydraulic chamber between the piston and the diaphragm and being spaced from the adjacent end of the cylinder to provide a low-pressure hydraulic chamber between the piston and end of the cylinder, all of said chambers being filled with liquid in all positions of the piston rod, a conduit connecting the low-pressure chambers to permit liquid to flow from one low-pressure chamber to the other when the piston rod is moved, and a movable piston forming the end of one of the low-pressure chambers.

2. Hydraulic damping means including in combination a cylinder closed at its ends, a diaphragm fixed in the cylinder dividing it in two parts, a piston rod passing through one of the closed ends into the cylinder and through the diaphragm, a restricted orifice connecting said two parts, a pair of pistons fixed to the rod on opposite sides of the diaphragm, each piston being spaced from the diaphragm to provide a high-pressure hydraulic chamber between the piston and the diaphragm and being spaced from the adjacent end of the cylinder to provide a low-pressure hydraulic chamber between the piston and end of the cylinder, all of said chambers being filled with liquid in all positions of the piston rod, and a conduit connecting the low-pressure chambers to permit liquid to flow from one low-pressure chamber to the other when the piston rod is moved and a movable piston surrounding the rod and forming the end of the low-pressure chamber through which the piston rod enters, said movable piston being adapted to maintain the low-pressure chambers completely filled to compensate for changes in volume caused by movement of the piston rod into and out of the cylinder.

3. Hydraulic damping means including in combination a cylinder closed at its ends, a diaphragm fixed in the cylinder dividing it in two parts, a piston rod passing through one of the closed ends into the cylinder and through the diaphragm, a restricted orifice connecting said two parts, a pair of pistons fixed to the rod on opposite sides of the diaphragm, each piston being spaced from the diaphragm to provide a high-pressure hydraulic chamber between the piston and the diaphragm and being spaced from the adjacent end of the cylinder to provide a low-pressure hydraulic chamber between the piston and end of the cylinder, all of said chambers being filled with liquid in all positions of the piston rod, a conduit connecting the low-pressure chambers to permit liquid to flow from one low-pressure chamber to the other when the piston rod is moved, and a movable piston surrounding the rod and forming the end of the low-pressure chamber through which the piston rod enters, said movable piston being adapted to be moved into the cylinder by atmospheric pressure to maintain the low-pressure chambers completely filled and compensate for decrease in volume caused by movement of the piston rod out of the cylinder.

4. Hydraulic damping means including in combination a cylinder closed at its ends, a diaphragm fixed in the cylinder dividing it in two parts, a piston rod passing through one of the closed ends into the cylinder and through the diaphragm, the piston rod including a core, a restricted orifice connecting said two parts, a pair of pistons fixed to the rod on opposite sides of the diaphragm, each piston being spaced from the diaphragm to provide a high-pressure hydraulic chamber between the piston and the diaphragm and being spaced from the adjacent end of the cylinder to provide a low-pressure hydraulic chamber between the piston and end of the cylinder, all of said chambers being filled with liquid, a groove formed in the piston rod core and extending from one low-pressure chamber to the other and a sleeve surrounding the piston rod core between the pistons to provide a conduit isolated from the high-pressure chambers and extending between the low-pressure chambers, the hydraulic damping means including means for maintaining all of said chambers filled with liquid in all positions of the pistons in all orientations of the cylinder.

5. Hydraulic damping means including in combination a cylinder closed at its ends, a diaphragm fixed in the cylinder dividing it in two parts, a piston rod passing through one of the closed ends into the cylinder and through the diaphragm, the piston rod including a core, a restricted orifice connecting said two parts, a pair of pistons fixed to the rod on opposite sides of the diaphragm, each piston being spaced from the diaphragm to provide a high-pressure hydraulic chamber between the piston and the diaphragm and being spaced from the adjacent end of the cylinder to provide a low-pressure hydraulic chamber between the piston and end of the cylinder, all of said chambers being filled with liquid, a groove formed in the piston rod core extending between the low-pressure chambers, an orifice in each piston, a flexible disk surrounding the piston rod adjacent each piston and covering the orifice on the side of the high-pressure chamber, a sleeve surrounding the piston rod core, the ends of said sleeve being seated against the disks to hold the disks against the pistons and to prevent communication between the groove and the high-pressure chambers, the hydraulic damping means including means for maintaining all of said chambers filled with liquid in all positions of the pistons in all orientations of the cylinder.

6. Hydraulic damping means including in combination a cylinder closed at its ends, a diaphragm fixed in the cylinder dividing it in two parts, a piston rod passing through one of the closed ends into the cylinder and through the diaphragm, a restricted orifice connecting said two parts, a pair of pistons fixed to the rod on opposite sides of the diaphragm, each piston being spaced from the diaphragm to provide a high-pressure hydraulic chamber between the piston and the diaphragm and being spaced from the adjacent end of the cylinder to provide a low-pressure hydraulic chamber between the piston and end of the cylinder, one of said low pressure chambers being expansible, all of said chambers being filled with liquid in all positions of the piston rod, and a conduit connecting the low-pressure chambers to permit liquid to flow from one low-pressure chamber to the other when the piston rod is moved.

HAROLD W. DAVIS.
WINTHROP A. JOHNS.

REFERENCES CITED

The following references are of record in the file of this patent:

UNITED STATES PATENTS

| Number | Name | Date |
| --- | --- | --- |
| 333,831 | Corliss | Jan. 5, 1886 |
| 396,108 | Nickerson | Jan. 15, 1889 |
| 1,183,281 | Derihon | May 16, 1916 |
| 1,273,059 | Hild | July 16, 1918 |
| 2,029,829 | Messier | Feb. 4, 1936 |

FOREIGN PATENTS

| Number | Country | Date |
| --- | --- | --- |
| 373,977 | Great Britain | June 19, 1930 |